INVENTOR
GEORGE G. COPELAND

United States Patent Office 3,414,468
Patented Dec. 3, 1968

3,414,468
PROCESS OF REGENERATING PULPING LIQUOR FROM CELLULOSE DIGESTION WASTE LIQUOR
George G. Copeland, Rushville, Ind., assignor to Copeland Process Corporation, Oak Brook, Ill., and Container Corporation of America, Chicago, Ill., both corporations of Illinois
Filed Aug. 13, 1965, Ser. No. 479,460
4 Claims. (Cl. 162—30)

ABSTRACT OF THE DISCLOSURE

Disclosed is a process for reconverting lime mud to lime for use in reforming alkaline pulping liquor. The process comprises adding black liquor, desirably containing about 50–70% solids, to lime mud to form an admixture containing about 40–70% solids and with the ratio of black liquor to lime mud being about 1:4 to 1:20, and then calcining the admixture to form lime. By adding the black liquor to the lime mud some of the required heat is supplied.

---

Figure 1:
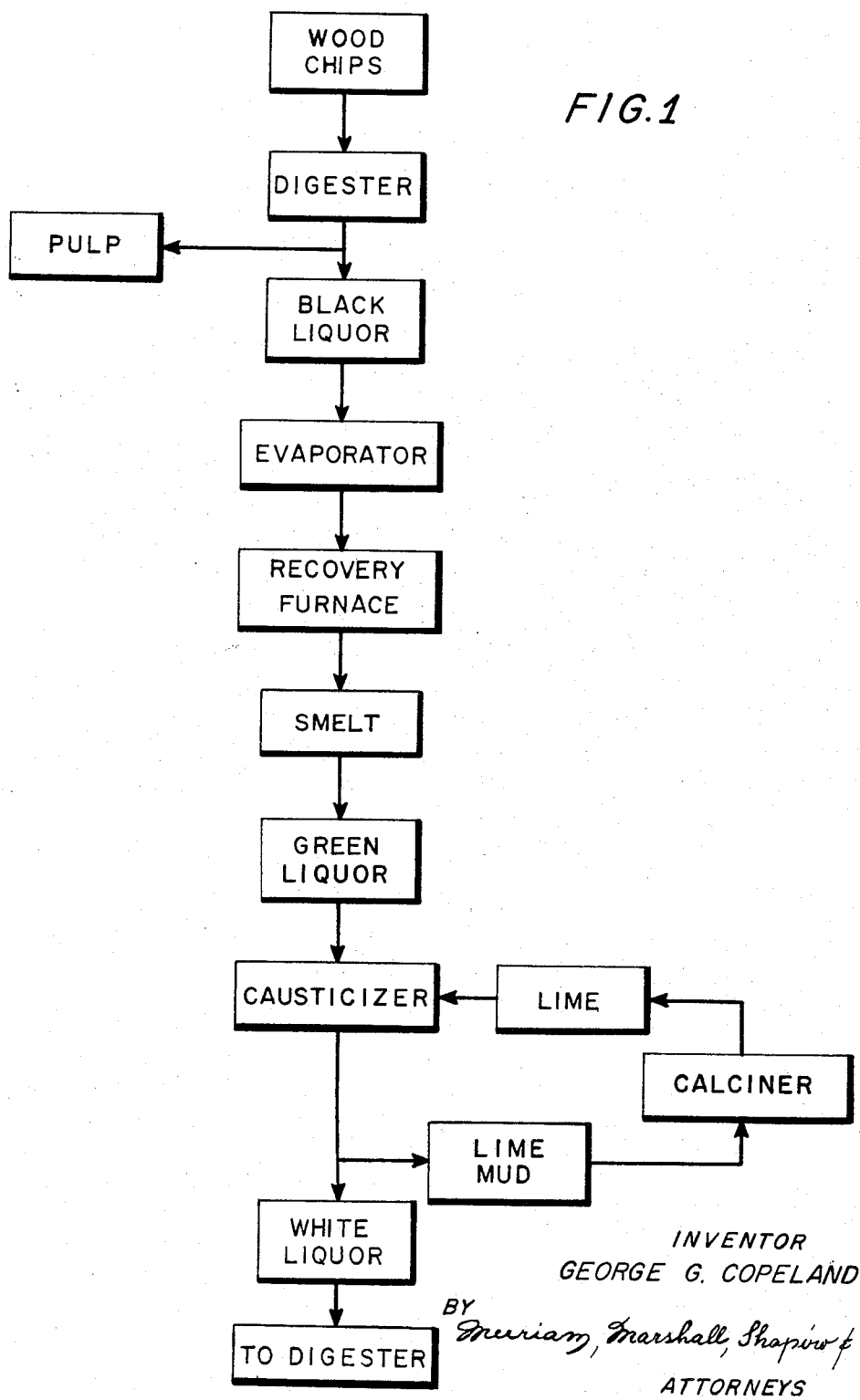

This invention relates to an improvement in chemical recovery in producing pulp from wood. In its more specific aspect, this invention relates to the practical regeneration of slaked lime for reuse in the alkaline process of pulp manufacture for paper mills.

The two alkaline processes for pulping wood are soda and sulfate (including kraft) processes. For both processes, sodium hydroxide is the major digesting chemical, but sodium sulfide is also important in the sulfate process. Although this invention is described hereinbelow in detail with respect to the sulfate process, it should be understood that the invention includes the soda process as well.

In the sulfate process for producing paper pulp, the wood chips are cooked or digested in a mixture commonly referred to as white liquor, which comprises sodium hydroxide (caustic soda) and sodium sulfide. During the digestion operation, various organic materials, such as lignin and resins, are extracted from the cellulose components of the wood. The spent cooking or digestion liquor is separated from the resulting pulp, and the pulp is further refined or treated. The recovered liquor, known as "black liquor," contains lignin and other organic matter extracted from the pulp and any excess of chemicals not consumed in the digestion, and also possesses calorific value.

This black liquor is regenerated for use in further digestion operations by first passing it through evaporators to obtain greater concentration. At this stage, certain cooking chemicals may be replenished, and the concentrated liquor is then burned in a chemical recovery furnace to remove the organic matter. A molten ash, or smelt, comprising primarily the inorganic sodium compounds, is discharged from the furnace and is dissolved in a solution of weak liquor to form what is known as "green liquor." Green liquor contains sodium carbonate, a trace of caustic soda, sodium sulfide, and other salts. Calcium oxide or lime is added to the green liquor to convert the sodium carbonate to caustic soda. This is referred to as causticizing, and the calcium carbonate or slaked lime suspension is recovered. The resulting clear fluid is the "white liquor" referred to above, containing sodium hydroxide and sodium sulfide, and is recirculated to the digester as a solvent in the digestion process.

The calcium carbonate is recovered from the causticizing step, and this recovered product is commonly referred to as lime mud. This product is regenerated by calcining at elevated temperatures to convert the calcium carbonate to calcium oxide which is recycled for use in causticizing subsequent batches of black liquor. It is common practice to thermally decompose the lime mud in a fluidized bed to produce the desired oxide. This decomposition reaction in the fluidized bed is endothermic, and fuel must be supplied to the bed. This is usually accomplished by injecting fuel oil or natural gas into the bed to maintain the required decomposition temperatures usually within the range of 1500 to 2100° F. The addition of a small percentage of sodium compounds, particularly sodium carbonate, promotes pelletizing of the calcium oxide discharged from the bed. This is desirable from an operational and product standpoint in that it reduces the dust problem.

This invention has therefore as its purpose to provide a more expeditious and simplified method of regenerating the lime mud for reuse in the causticizing operation.

In general, the invention comprises an improvement in the alkaline process for pulping of wood which includes the cyclic steps of digesting comminuted wood or wood chips with an alkaline digesting liquor to produce paper pulp. The spent cooking or digestion liquor is recovered as black liquor which is high in sodium salts content and possesses calorific value. The black liquor is regenerated desirably first by concentrating the liquor solution, then forming a smelt which is subsequently dissolved and regenerated by causticizing with calcium oxide or lime to reform the alkaline digesting liquor to digest further quantities of wood chips. According to my invention, a portion of the black liquor which desirably has been concentrated by evaporation is admixed with the lime mud recovered from the causticizing step. The resulting admixture is then calcined as in a fluidized bed to thermally decompose the calcium carbonate and to convert the calcium carbonate to calcium oxide. The resulting oxide product is recovered from the calcining step and reused for causticizing subsequent batches of black liquor. The organic matter present in the black liquor which is admixed with the lime mud supplies energy values for the calcining operation thereby reducing the amount of extraneous fuel required. In addition, the sodium salts present in the black liquor effect the desired agglomeration of the lime to provide a pelletized product.

Reference is now made to FIGURE 1 which constitutes a flow sheet of the process of the present invention.

In the sulfate process, wood chips are treated in a digester at elevated temperatures and pressures with sodium hydroxide and sodium sulfide in a liquor referred to as white liquor, and this process is well known to those skilled in the art. The concentration or strength of the cooking liquor and the operation conditions will vary depending upon such factors as the type of wood chips undergoing treatment, the type of pulp desired, and the specific process employed. A substantial percentage of the alkali is consumed in reacting with lignin, various organic acid, resinous matter and in dissolution of carbohydrates.

After digestion is completed, the pulp is separated from the spent liquor and washed with a suitable washing agent, e.g. water, to recover the black liquor solids and the pulp washings are combined with the spent liquor. The combined spent liquor and washings, commonly known as black liquor, contain practically all the alkali originally added together with over half the original weight of wood which affords a B.t.u. potential. In practice, the black liquor is sampled and tested for amount of organic matter and for the concentration of sodium salts such as alkali, sodium sulfate and sodium sulfide.

The black liquor is concentrated by evaporation, and this is commonly done in a two-step operation. Evaporation is first done in vacuum, multiple-effect evaporators, and the concentration discharged from the last effect is about 50 to 55 percent by weight solids. The liquor is further concentrated in cascade evaporators to a concentration of about 65 to 70 percent. A portion of the concentrated black liquor is passed to a mixing means for admixture with the recovered lime mud, described hereinafter in greater detail. Make-up chemical is added to the remaining concentrated black liquor to replenish the sodium and sulfur compounds lost in the process, which is then further treated for reconverting it to white liquor for use in subsequent digestion operations.

In converting the concentrated black liquor to white liquor, the black liquor is passed to a preheater where it is preheated to about its boiling point or slightly above, e.g. 200 to 240° F. The hot, concentrated liquor is then sprayed under a pressure of from about 20–35 p.s.i. onto the inner walls of a salt recovery furnace where the water in the liquor is evaporated. This produces a char and the organic matter is burned in the presence of hot air at the bottom of the furnace, and the heat generated is utilized in the production of steam.

The inorganic sodium salts, comprising mostly a mixture of sodium carbonate and sodium sulfide, are discharged from the furnace bottom as a smelt. The smelt is dissolved in a solution of wash waters from the mill operations to form the green liquor which is usually clarified to remove the impurities therefrom.

The clarified green liquor is passed to the causticizing plant where lime or calcium oxide is added to the liquor to convert the sodium carbonate to sodium hydroxide. The reaction for this is expressed simply by the following equation:

$$CaO + Na_2CO_3 + H_2O = 2NaOH + CaCO_3$$

In the causticizing process, the clarified green liquor which is usually maintained at a temperature of about 200 to 215° F. is passed to the slaker where lime is added. The amount of lime added depends primarily upon the concentration of the sodium carbonate in the liquor, but other factors, such as the strength of the solution, the presence of other sodium salts and temperature, effect the completion of the reaction. In plant practice, the causticizing step may be carried out continuously, and a slight excess of lime may be employed.

The causticized liquor is passed to a filtering plant or decanter where the lime mud comprising calcium carbonate is filtered out or decanted from the resulting fluid known as white liquor. The lime mud entrains a measurable amount of sodium hydroxide which is recovered by washing, and the washings may be employed in dissolving the smelt from the recovery furnace.

In order to reduce the moisture content in the lime mud, it is usually passed to a vacuum filter and discharged from there at about 55 to 60 percent by weight solids. The lime mud is then passed to a mixer where the mud is admixed with concentrated black liquor pumped from the cascade evaporator. The black liquor possesses high calorific value because of the presence of combustible organic matter and also is rich in sodium salts and/or complex organo-sodium salts. It should be understood that the term "sodium salts" used herein is intended to include the complex organo-sodium salts. The resulting admixture is calcined at a sufficient temperature to thermally decompose the calcium carbonate and convert it to calcium oxide. Generally, decomposition occurs within the temperature range of about 1500 to 2100° F.

At the elevated temperatures employed during calcining, the combustible organic matter is burned thereby providing calorific value to the operation and consequently reducing considerably the amount of extraneous heat required. In addition, the sodium salts contained in the black liquor and incorporated into the admixture of liquor and lime mud, effectively agglomerate the mud which in turn promotes the formation of a pelletized lime product discharged from the calciner.

The amount of concentrated black liquor for use in admixture with the lime mud will depend largely on the suspended and dissolved solids content of the liquor. Generally, the liquor contains 65 percent by weight solids, which solids comprise about 65 percent by weight combustible organic matter and about 35 percent by weight sodium salts. It should be understood, however, that the solids content can vary considerably from batch to batch and among different mill operations. The amount of black liquor employed in the admixture to calcium carbonate should be in a ratio of from about 1:20 to 1:4, by weight. Thus, the black liquor content should be from about 5 to 20 percent by weight of the liquor-calcium carbonate mixture. A ratio of about one part black liquor to 10 parts calcium carbonate, by weight, is particularly desirable. Quantities providing a ratio below about 1:20 usually provide insufficient calorific values and/or sodium salts to promote pelletizing. On the other hand, it is not economical to provide a ratio above 1:4, and further such a high ratio of black liquor results in excessive amounts of sodium salts present in the lime which might upset the causticizing reaction. Generally, the total amount of sodium salts present in admixture with the lime mud should not be less than ½ percent by weight up to about 5 percent, and more preferably from about 1½ to 3 percent by weight. When using black liquor providing greater amounts than about 5 percent by weight sodium salts, excessive agglomeration of the lime occurs thereby rendering in difficult to produce a consistent lime product and further interferring with fluidized bed operations.

Figure 2:
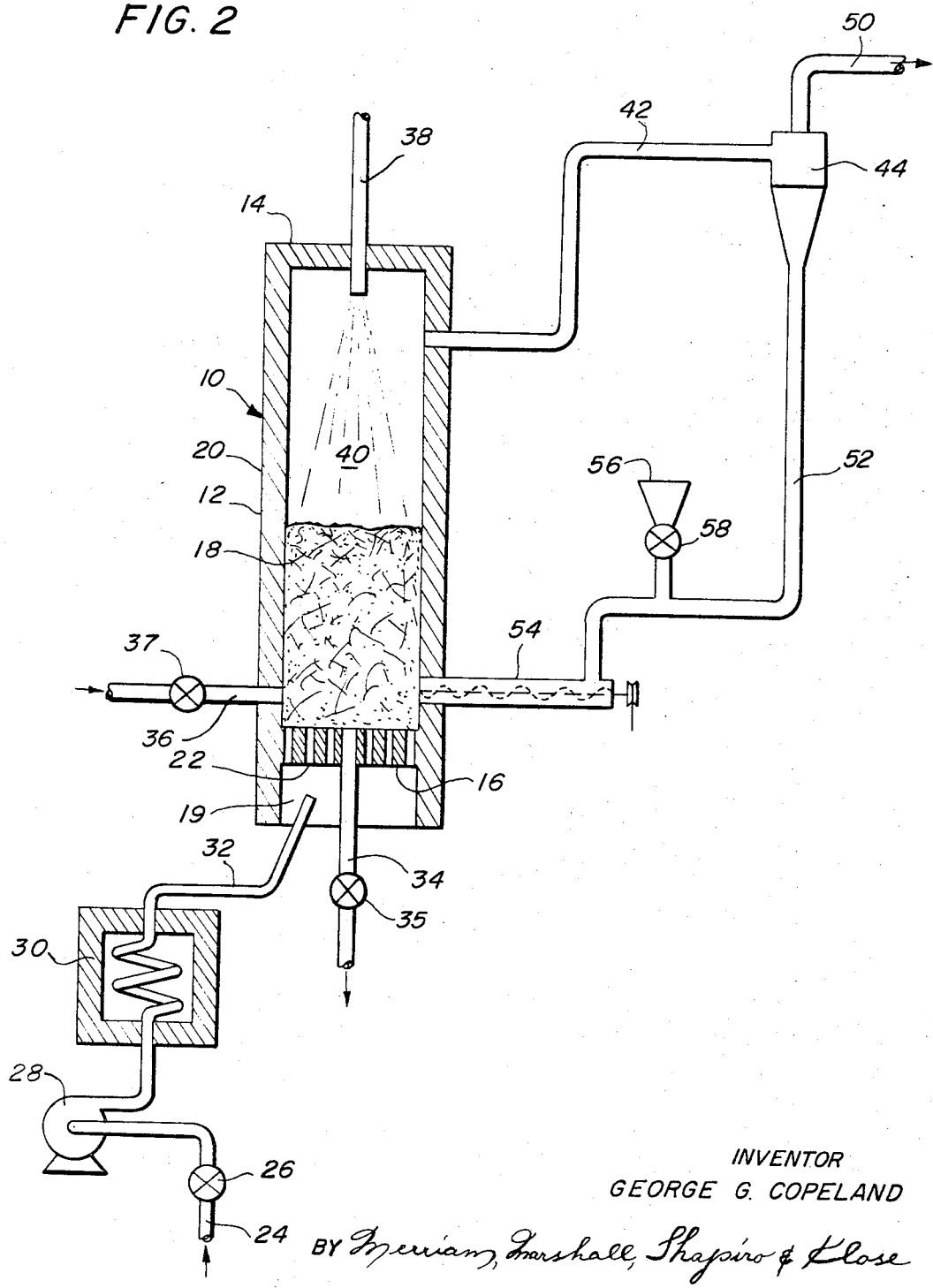

The admixture of lime mud and black liquor is desirably calcined in a fluidized bed. Referring to FIGURE 2, there is shown a fluidized-bed roasting furnace 10 having an outer shell 12, a top plate 14, a bottom section 16 to support the bed of solids 18, and a windbox 19. The furnace is suitably lined as with insulating brick and/or firebrick 20. Bottom section 16 is provided with a plurality of apertures or orifices 22 which serve to conduct fluidizing gases, e.g. air, therethrough and into bed 18.

In the roasting furnace 10, a fluidized bed 18 is maintained by passing gases from a suitable source (not shown) via conduit 24 having control valve 26 and then through a blower or compressing device 28 before introducing it to the preheater 30 to add the desired degree of sensible heat to the fluidizing gases. The preheater is used only during start-up, as described hereinbelow. Generally, the gases are heated to a temperature of from about 500 to 1200° F. The preheated gases are conveyed via conduit 32 into windbox 19 and pass through the plurality of apertures 22 and into the bottom of fluidized bed 18. The gases pass upward through the fluidized bed 18 maintaining it in continual agitation with violent action, commonly known as a state of fluidization. The height of the fluidized bed 18 is maintained at a desired level by the rate of discharge of the calcined product through discharge conduit 34 having control valve 35.

Fuel is supplied to the bed via line 36 having a control valve 37. Suitable fuels include, for example, fuel oil or natural gas. The preheater 30 is used to raise the temperature of the fluidized gases to the ignition temperature of the fuel used in the process. In conventional operations, fuel is continuously added to the bed to satisfy the thermal requirements of the calcination operation. In accordance with the present invention, however, the organic matter in the black liquor replaces the fuel input to satisfy these fuel requirements. Once the ignition temperature is reached, the preheater and/or conventional fuel supply may be discontinued wholly or in part thereby resulting in substantial savings. Where desired, the preheater may be operated at start-up at a temperature of about 1100 to 1200° F. to effect ignition thereby eliminating the need for a separate conventional fuel supply line.

The admixture of lime mud and black liquor containing about 40 to 70% solids, and more preferably of optimum consistency that facilitates feeding of the admixture to the furnace, is fed via feed line 38 from the top portion of the furnace at a level above the fluidized bed 18. As the feed to the furnace falls downwardly to reach the bed, the feed is first contacted with hot fluidizing gases in the freeboard 40 and becomes partially dried. When the admixture reaches the bed, it becomes fluidized and calcined by the uprising gases to thermally decompose the calcium carbonate to form calcium oxide. The dry, calcined product as pellets is discharged from the roasting furnace 10 through discharge conduit 34. The pelletized product may be conveyed directly to the slaker, or may be passed to storage for subsequent use.

Exhaust gases containing the evaporated water, the gaseous products of combustion and calcination, and some entrained solids are conducted from the freeboard 40 of the furnace through conduit 42 into the cyclone collector 44, which may include a wet-scrubbing system, where the fines are collected and the gases exhausted to the atmosphere through vent pipe 50. The fines or particulate matter removed from the exhaust gases by the cyclone collector 44 may be returned directly to the fluidized-bed roasting furnace 10 through conduit 52 and screw-feed return 54 at a point below the top level of the fluidized bed 18. Make-up material of fresh lime or calcium carbonate can be introduced into the roasting furnace through hopper 56 having a valve or feeder 58 that leads to the screw-feed return 54.

The fluidized bed in the roasting furnace is generally composed of the calcined inorganic chemicals derived from the admixture of lime mud and liquor, as, for example, calcium oxide, sodium sulfate, sodium carbonate, sodium hydroxide and mixtures thereof. The particle size of the bed advisably is maintained within the range of minus 8 to plus 100 mesh (Tyler Standard Screen). Fluidization of the particles within the bed is maintained by the passage of gases, e.g. air, through the apertures 22 in bottom section 16 and then upward through the bed of fluidized particles at a linear velocity of about 1 to 10 feet per second, and more preferably 2 to 5 feet per second. The temperature of the bed is maintained at between 1500 to 2100° F. which is sufficient to decompose the calcium carbonate to form calcium oxide.

In the calcining operation, extraneous heat is furnished by preheating the fluidizing gases or by combustion of fuel added separately to the bed, as, for example, natural gas (methane) or fuel oil, for purposes of better control or for convenience in operation. However, one of the principal advantages afforded by this invention is that a considerable portion of the necessary thermal energy required for the process is furnished by the autogenous combustion of the combustible organic extractants present in the black liquor originating from the raw material used for pulping which is admixed with the lime mud. The required thermal energy to sustain an autogenous operation, which is that amount of heat necessary to evaporate the water content of the waste liquor, to furnish the sensible heat necessary to raise the components to combustion and calcination reaction temperature, to supply the heat required for the decomposition of calcium carbonate which is endothermic, and to compensate for the heat losses from the reactor, is supplied wholly or partly by preconcentration of the waste liquor by conventional evaporation to a suitable combustible content.

A still further advantage is that the invention provides an economical and expeditious source of sodium compounds for addition to the lime mud. As explained above, the sodium compounds agglomerate the lime mud which promotes pelletizing of the calcium oxide product recovered from the calciner. This is exceedingly desirable in that it minimizes or eliminates dust formation and affords ease in handling the product.

In the following example, which further illustrates the uses and advantages of the invention, one gallon of black liquor is recovered from the cascade evaporator in the sulfate process for pulping wood. This black liquor is found to contain about 65% by weight solids, which solids include 35 percent by weight sodium salts and 65 percent by weight combustible organic matter. This black liquor is thoroughly admixed with 10 gallons of lime mud which is recovered from the causticizing step, the lime mud comprising about 60% by weight solids (mostly calcium carbonate). The resulting admixture is calcined in a fluidized bed at about 1800° F. to thermally decompose the calcium carbonate to form calcium oxide. The resulting product is recovered from the calcination step as pellets, which may be reused in further causticizing operations. Because of the presence of combustible organic matter in the black liquor admixed with the lime mud, the amount of extraneous fuel required for calcination is substantially eliminated.

Having described my invention and certain embodiments, I claim:

1. In the alkaline process for pulping of wood including the cyclic steps of digesting comminuted wood with an alkali digestion liquor to produce paper pulp, recovering the resulting black liquor for further treatment to obtain useful pulping liquor including the step of causticizing with calcium oxide to reform alkaline digestion liquor to digest further quantities of wood, calcining the resulting lime mud comprising calcium carbonate recovered from said causticizing step to form calcium oxide for recycling to the causticizing step: the improvement which comprises, admixing a portion of the black lquor with the recovered lime mud, said black liquor containing combustible organic matter and sodium salts; said black liquor being added to said lime mud in a ratio of from 1:20 to 1:4, by weight; said resulting admixture containing about 40 to 70% solids and from about 1½ to 5% by weight of sodium salts; calcining said resulting admixture in a fluidized bed at a temperature of from about 1500 to 2100° F., said combustible organic matter supplying at least in part the thermal requirements for said calcining; and recovering therefrom calcium oxide.

2. The process of claim 1 wherein said resulting admixture contains from 1½ to 3% by weight of sodium salts.

3. In the alkaline process for pulping of wood including the cyclic steps of digesting comminuted wood with an alkali digestion liquor to produce paper pulp, recovering the resulting black liquor for further treatment to obtain useful pulping liquor including the step of causticizing with calcium oxide to reform alkaline digestion liquor to digest further quantities of wood, calcining the resulting lime mud comprising calcium carbonate recovered from said causticizing step to form calcium oxide for recycling to the causticizing step: the improvement which consists of admixing a portion of the black liquor with the recovered lime mud, said black liquor containing combustible organic matter and sodium salts, said black liquor being added to said lime mud in a ratio of from 1:20 to 1:4 by weight, said resulting admixture containing about 40 to 70% solids, calcining said resulting admixture, said combustible organic matter supplying at least in part the thermal requirements for said calcining and the sodium salts are present in an amount sufficient to promote pelletization of said calcium oxide, and recovering therefrom calcium oxide.

4. The process of claim 3 wherein said resulting admixture contains from 1½ to 3% by weight of sodium salts.

References Cited

UNITED STATES PATENTS

| | | | |
|---|---|---|---|
| 1,374,889 | 4/1921 | White | 162—30 |
| 1,801,945 | 4/1931 | White | 23—48 |
| 3,309,262 | 3/1967 | Copeland et al. | 162—30 |

S. LEON BASHORE, *Primary Examiner.*

UNITED STATES PATENT OFFICE
CERTIFICATE OF CORRECTION

Patent No. 3,414,468

December 3, 1968

George G. Copeland

It is certified that error appears in the above identified patent and that said Letters Patent are hereby corrected as shown below:

Column 2, line 55, "acid" should read -- acids --. Column 4, line 27, "in" should read -- it --. Column 6, line 18, cancel "ments, I claim:" and insert the same between lines 16 and 17, same column 6; same column 6, line 29, "lquor" should read -- liquor --; line 33, "1-1/2" should read -- 1/2 --.

Signed and sealed this 10th day of March 1970.

(SEAL)
Attest:

Edward M. Fletcher, Jr.
Attesting Officer

WILLIAM E. SCHUYLER, JR.
Commissioner of Patents